United States Patent [19]
Iwasaki

[11] Patent Number: 5,319,632
[45] Date of Patent: Jun. 7, 1994

[54] TRANSMISSION NETWORK IN WHICH A COMMUNICATION PATH IS AUTOMATICALLY RESTORED IN ACCORDANCE WITH OCCURRENCE OF A FAILURE IN A DISTRIBUTED WAY

[75] Inventor: Junko Iwasaki, Tokyo, Japan
[73] Assignee: NEC Corporation, Tokyo, Japan
[21] Appl. No.: 5,212
[22] Filed: Jan. 15, 1993
[30] Foreign Application Priority Data
  Jan. 17, 1992 [JP] Japan .................................. 4-006781
[51] Int. Cl.⁵ ........................ H04J 3/14; H04L 12/26; H04L 29/14
[52] U.S. Cl. ..................................... 370/16; 371/8.2; 371/11.2
[58] Field of Search ................. 370/13, 16, 58.1, 58.2, 370/58.3, 60, 60.1; 371/8.1, 8.2, 11.1, 11.2

[56] References Cited
U.S. PATENT DOCUMENTS

| | | | |
|---|---|---|---|
| 4,365,248 | 12/1982 | Bargeton et al. | 370/16 |
| 4,991,204 | 2/1991 | Yamamoto et al. | 370/16 |
| 5,105,420 | 4/1992 | Ardon et al. | 370/16 |
| 5,212,475 | 5/1993 | Thoma | 370/16 |

*Primary Examiner*—Wellington Chin
*Attorney, Agent, or Firm*—Foley & Lardner

[57] ABSTRACT

For enabling automatic restoration of a path in a transmission network including a plurality of crossconnect systems and a plurality of communication routes, a unit specifying circuit specifies, as a first and a second specified unit, two of the crossconnect systems in accordance with a particular route which is selected as the path. It will be assumed that a failure occurs in a particular point of the path. In this event, the first specified unit executes a predetermined operation in cooperation with the second specified unit. When the predetermined operation finishes, each of the crossconnect systems is operable to select, as the path, another one of the communication routes. It is preferable that the failure is detected in accordance with a path alarm indication signal which is surely supplied from the particular point to each of the first and the second specified units.

4 Claims, 3 Drawing Sheets

TRANSMISSION NETWORK IN WHICH A COMMUNICATION PATH IS AUTOMATICALLY RESTORED IN ACCORDANCE WITH OCCURRENCE OF A FAILURE IN A DISTRIBUTED WAY

BACKGROUND OF THE INVENTION

This invention relates to a transmission network such as a synchronous transmission network and, more particularly, to an apparatus for administrating the transmission network.

Recently, a transmission network of the type is actively utilized by many operating companies. The transmission network includes a plurality of communication routes parallel to one another. Each of the communication routes has at least two crossconnect systems. Any one of the crossconnect systems may be used in common in two or more ones of the communication routes. Communication is carried out through a path, namely, a particular one of the communication routes.

It is assumed that a failure occurs in the particular route. Such occurrence of the failure results in serious damage to the operating company. It is therefore required to carry out a switching operation which is for switching the path from the particular route into another one of the communication routes as immediately as possible after occurrence of the failure.

In Japanese Patent Prepublication (Kôkai or Publication of Unexamined Patent Application) Nos. 58542/1991 and 117140/1991 for inventions by Yasuyo Nisimura, a specific logical algorithm is disclosed in order to carry out the switching operation. When the failure occurs at a particular point in the particular route, an alarm indication signal is generated at the particular point in the manner known in the art. In response to the alarm indication signal, execution of the specific logical algorithm is initiated in each crossconnect system to make a combination of the crossconnect systems carry out the switching operation.

Generally, an add drop multiplexer and a line terminating equipment are connected between the crossconnect systems. Accordingly, it will be assumed that the add drop multiplexer or the line terminating equipment is interposed between the particular point and each of the crossconnect systems. A line alarm indication signal is known as the alarm indication signal. The line alarm indication signal is terminated at each of the add drop multiplexer and the line terminating equipment and does not reach each crossconnect system. As a result, execution of the above-mentioned specific logical algorithm is not started in each crossconnect system.

A path alarm indication signal is also known as the alarm indication signal. The path alarm indication signal arrives at each crossconnect system without being terminated at each of the add drop multiplexer and the line terminating equipment. By the use of the path alarm indication signal, it is therefore possible to start execution of the specific logical algorithm in each crossconnect system even if the add drop multiplexer or the line terminating equipment is interposed between the particular pint and each of the crossconnect systems.

It is also assumed that an additional crossconnect system is interposed between the first-mentioned crossconnect systems. In this event, execution of the specific logical algorithm is started also in the additional crossconnect system in response to the path alarm indication signal. This results in an disadvantage in the switching operation.

SUMMARY OF THE INVENTION

It is therefore an object of this invention to provide an apparatus which automatically restores a path in a transmission network from a particular route to another route when a failure occurs in the particular route.

It is another object of this invention to provide an apparatus of the type described, which is assured to carry out the switching operation even if add drop multiplexer or a line terminating equipment is interposed between crossconnect systems or if an additional crossconnect system is interposed between the first-mentioned crossconnect systems.

It is still another object of this invention to provide a transmission network in which a communication path is automatically restored in accordance with occurrence of a failure in a distributed way.

According to this invention, there is provided an apparatus for administrating a transmission network including a plurality of crossconnect systems and a plurality of communication routes parallel to one another among the crossconnect systems. The apparatus comprises route selecting means, unit specifying means, failure detecting means, operation executing means, and additional selecting means. The route selecting means is for selecting, as a path for communication, a particular one of the communication routes on carrying out the communication to produce a route signal representative of the particular one. The unit specifying means is connected to the route selecting means and is for specifying, as a first and a second specified unit, specific one of the crossconnect systems in accordance with the route signal. The specific ones are at both ends of the path, respectively. The failure detecting means is connected to the path and the first specified unit and is for detecting a failure in the path to produce a failure signal representative of the failure. The operation executing means is connected to the second specified unit and the failure detecting means and is for executing a predetermined operation in cooperation with the second specified unit in accordance with the failure signal to make the second specified unit generate a completion signal representative of completion of the predetermined operation. The additional selecting means is connected to the operation executing means and is for selecting, as the path, another one of the communication routes in accordance with the completion signal.

DESCRIPTION OF THE PREFERRED EMBODIMENT

Figure 1:
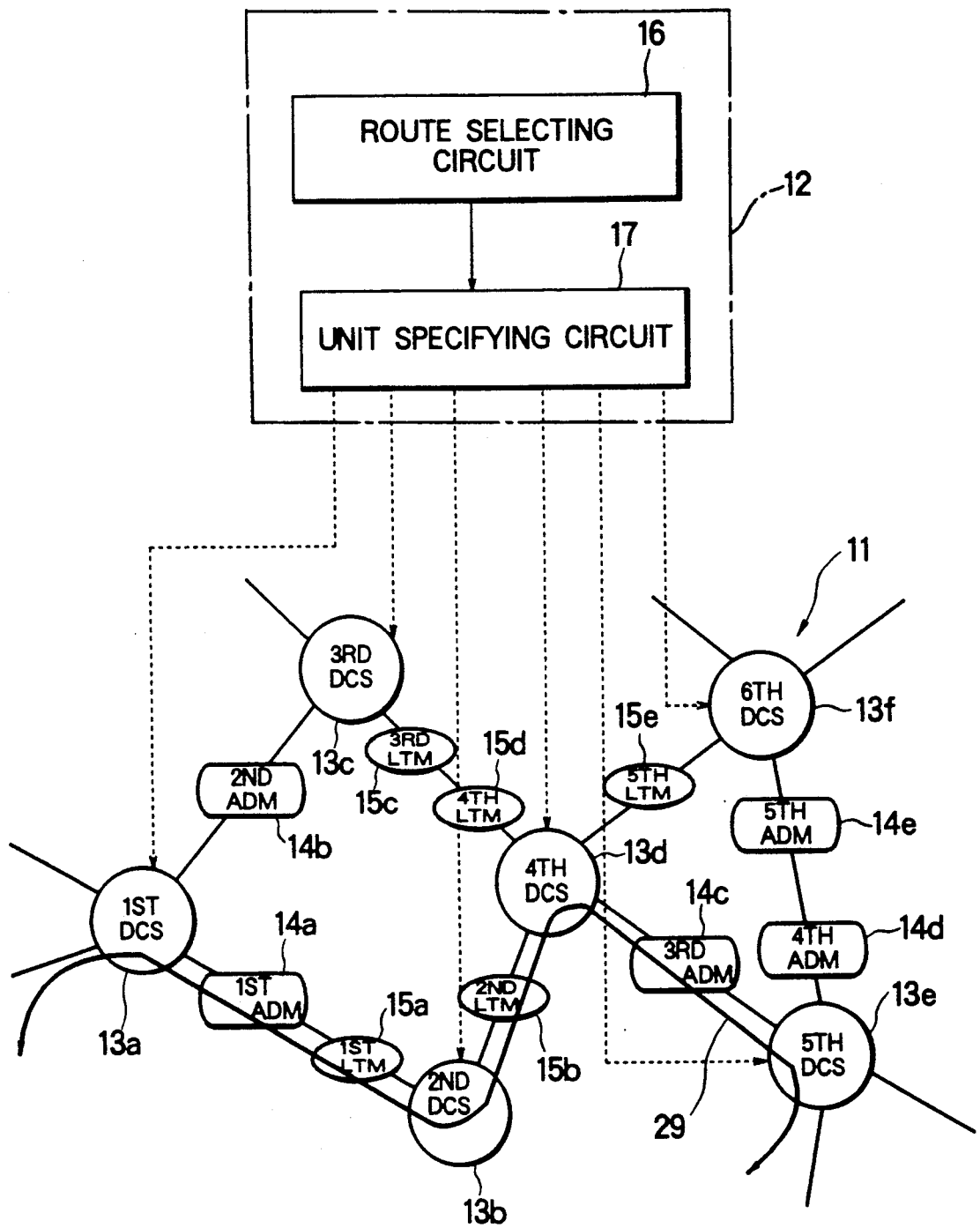
FIG. 1 is a block diagram illustrating an apparatus according to an embodiment of this invention together with a synchronous transmission network.

Referring to FIG. 1, description will be made as regards an apparatus according to an embodiment of this invention. The apparatus comprises an administration unit 12 for administrating a synchronous transmission network 11 which is generally called a synchronous optical network (SONET). In the manner known in the art, the synchronous transmission network 11 comprises first, second, third, fourth, fifth, and sixth crossconnect systems (DCS) 13a, 13b, 13c, 13d, 13e, and 13f, first, second, third, fourth, and fifth add drop multiplexers (ADM) 14a, 14b, 14c, 14d, and 14e, and first, second, third, fourth, and fifth line terminating equipments (LTM) 15a, 15b, 15c, 15d, and 15e.

The second crossconnect system 13b is connected through the first add drop multiplexer 14a and the first line terminating equipment 15a to the first crossconnect system 13a and through the second line terminating equipment 15b to the third crossconnect system 13c. The third crossconnect system 13c is connected through the second add drop multiplexer 14b to the first crossconnect system 13a and through the third and the fourth line terminating equipments 15c and 15d to the fourth crossconnect system 13d. The fifth crossconnect system 13e is connected through the third add drop multiplexer 14c to the fourth crossconnect system 13d and through the fourth and the fifth add drop multiplexers 14d and 14e to the sixth crossconnect system 13f. The fourth and the sixth crossconnect systems 13d and 13f are connected to each other through the fifth line terminating equipment 15e. Each of the first, the third, the fifth, and the sixth crossconnect systems 13a, 13c, 13e, and 13f is also connected to additional crossconnect systems which are not shown in the figure.

The description will be directed to a case where communication is carried out between the first and the fifth crossconnect systems 13a and 13e. In this event, first, second, third, and fourth communication routes can be established between the first and the fifth crossconnect systems 13a and 13e in the manner which will presently be described. The first communication route includes the first, the second, the fourth, and the fifth crossconnect systems 13a, 13b, 13d, and 13e. The second communication route includes the first, the third, the fourth, and the fifth crossconnect systems 13a, 13c, 13d, and 13e. The third communication route includes the first, the second, the fourth, the sixth, and the fifth crossconnect systems 13a, 13b, 13d, 13f, and 13e. The fourth communication route includes the first, the third, the fourth, the sixth, and the fifth crossconnect systems 13a, 13c, 13d, 13f, and 13e.

The administration unit 12 comprises a route selecting circuit 16 and a unit specifying circuit 17. In order to enable the communication, the route selecting circuit 16 selects, as a path for the communication, a particular one of the first through the fourth communication routes to generate a route signal representative of the particular route. The unit specifying circuit 17 is connected to the route selecting circuit 16 and the first through the sixth crossconnect systems 13a through 13f. Supplied with the route signal, the unit specifying circuit 17 generates a unit specifying signal for specifying, as first and second specified units, two of the first through the sixth crossconnect systems 13a through 13f that are located at both ends of the path. The unit specifying signal is supplied to each of the first through the sixth crossconnect systems 13a through 13f.

Figure 2:
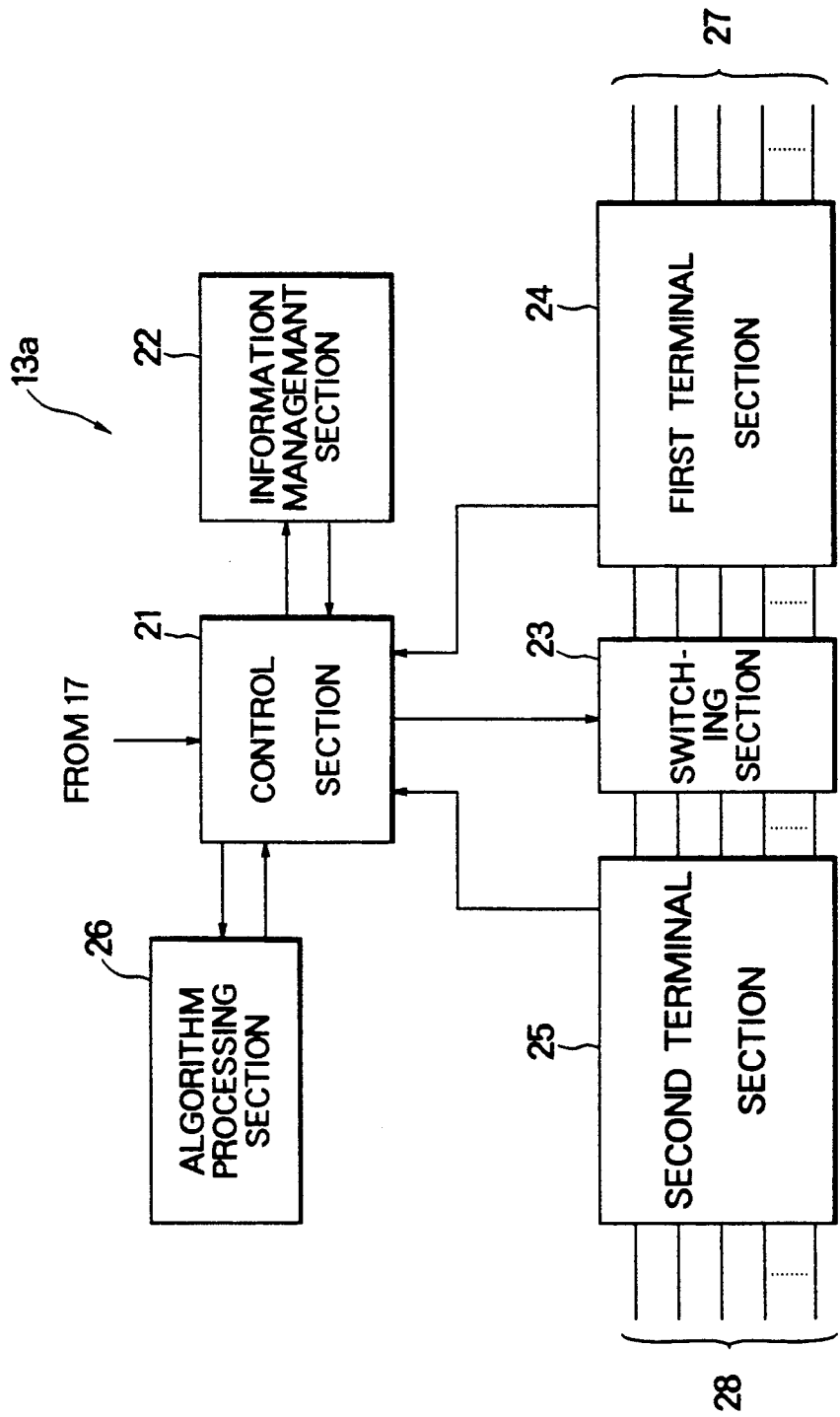
FIG. 2 is a block diagram of a crossconnect system included in the synchronous transmission network illustrated in FIG. 1.

Turning to FIG. 2, the description will proceed to the first crossconnect system 13a. The first crossconnect system 13a comprises a control section 21, an information management section 22, a switching section 22, a first terminal section 24, a second terminal section 25, and an algorithm processing section 26.

The control section 21 is connected to the unit specifying circuit 17 and the information management section 22. Supplied with the unit specifying signal from the unit specifying circuit 17, the control section 21 controls the information management section 22 in the manner which will presently be described. When the first crossconnect system 13a is specified by the unit specifying signal as the first specified unit, the information management section 22 memorizes first indication data or "Sender". When the first crossconnect system 13a is specified by the unit specifying signal as the second specified unit, the information management section 22 memorizes second indication data or "Chooser". When the first crossconnect system 13a is specified by the unit specifying signal neither as the first nor the second specified units, the information management section 22 memorizes neither the first nor the second indication data. In the following description, it is assumed that the first data are memorized in the information management section 22. In this event, the first crossconnect system 13a serves as the first specified unit.

The switching section 23 is connected to the control section 21 and to a large number of lines 27 and 28 in the manner known in the art. The lines 27 and 28 are connected to the first and the second add drop multiplexers 14a and 14b that are illustrated in FIG. 1. In the manner which will later be described in detail, the switching section 23 is for switching interconnection between the lines 27 and 28 under control of the control section 21.

The first terminal section 24 is connected to the control section 21 and the lines 27 and is for generating a failure signal in response to the path alarm indication signal described in the preamble of the present specification. Likewise, the second terminal section 25 is connected to the control section 21 and the lines 28 and is for generating a failure signal in response to the path alarm indication signal. The control section 21 generates a trigger signal in response to the failure signal and the first indication data.

The algorithm processing section 26 is connected to the control section 21. Supplied with the trigger signal, the algorithm processing section 26 processes the specific logical algorithm disclosed in the above-referenced publication in cooperation with the second specified unit. In other words, the algorithm processing section 26 executes a predetermined operation in cooperation with the second specified unit in accordance with the failure signal. In the manner which will presently be described, the second specified unit generates a completion signal representative of completion of processing of the specific logical algorithm. The algorithm processing section 26 is referred to as an operation executing arrangement.

The completion signal is supplied to the first, the second, the third, the fourth, and the sixth crossconnect systems 13a, 13b, 13c, 13d, and 13f. Responsive to the completion signal, the control section 21 makes the switching section 23 switch interconnection between the lines 27 and 28.

The description will be directed to a case where the information management section 22 memorizes the second indication data. In this event, the first crossconnect system 13a serves as the first specified unit. The control section 21 does not generate the trigger signal even if the failure signal is generated by at least one of the first and the second terminal sections 24 and 25. The algorithm processing section 26 processes the specific logical algorithm in cooperation with the first specified unit to generate the completion signal. Responsive to the completion signal, the control section 21 makes the switching section 21 switch interconnection between the lines 27 and 28.

Next, the description will proceed to a case where the information management section 22 memorizes neither the first nor the second indication data. In this event, even if the failure signal is generated by at least one of the first and the second terminal sections 24 and 25, the control section 21 does not generate the trigger signal. Therefore, the algorithm processing section 26 is not put into operation. Responsive to the completion signal, the control section 21 makes the switching section 23 switch interconnection between the lines 27 and 28.

Referring back to FIG. 1, each of the second through the sixth crossconnect systems 13a through 13f has a structure similar to that of the first crossconnect system 13a. In each of the second through the sixth crossconnect systems 13b through 13f, interconnection between the lines 27 and 28 is switched in response to the completion signal in the manner which is similar to that described in conjunction with the first crossconnect system 13a.

Figure 3:
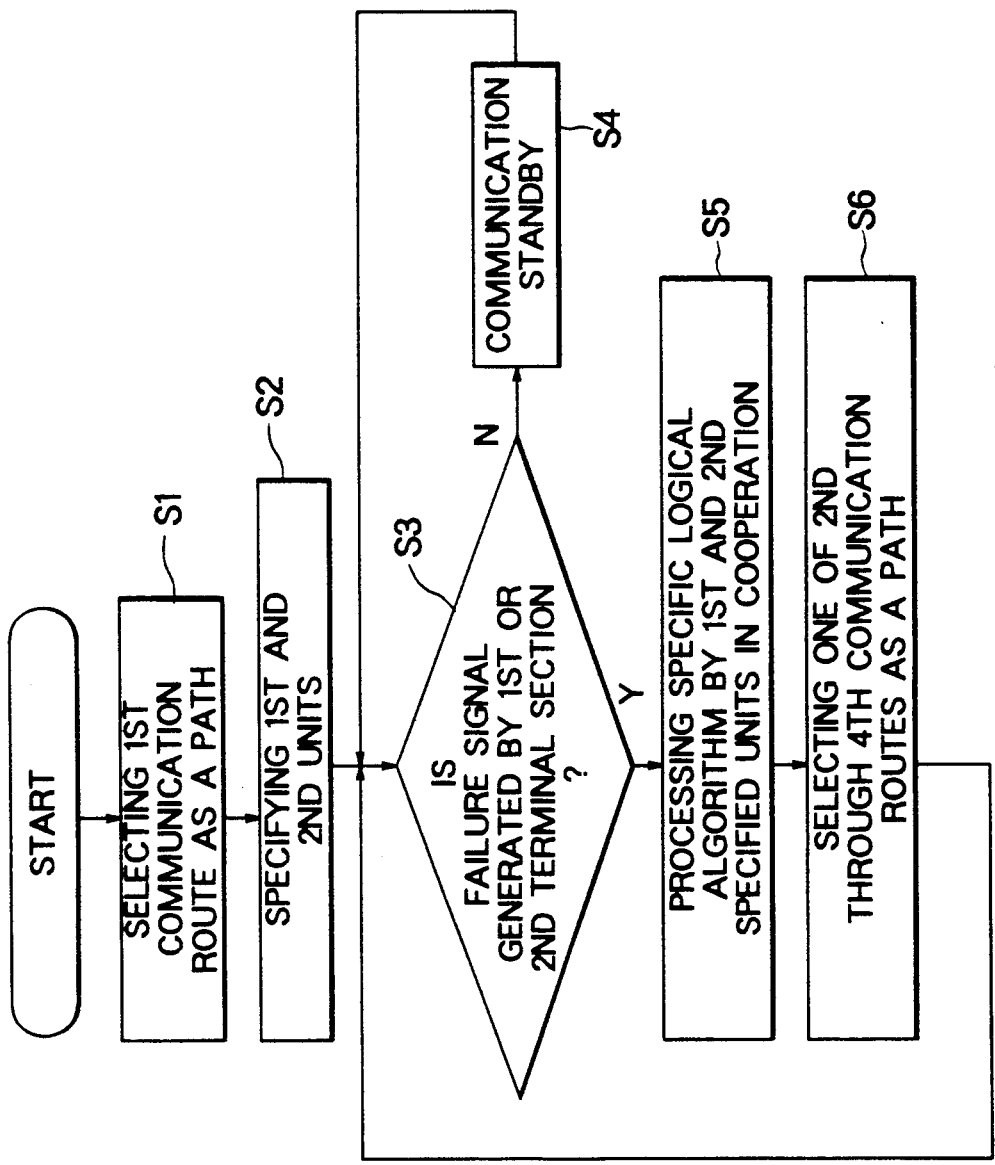
FIG. 3 is a flow chart for describing an operation of the apparatus illustrated in FIG. 1.

Referring to FIG. 3 together with FIGS. 1 and 2, an operation of the apparatus will be described. A start stage is followed by a first stage S1 at which the route selecting circuit 16 selects, as the path for the communication, the particular route. It will be assumed here that the communication is performed between the first and the fifth crossconnect systems 13a and 13e. In this event, the first communication route is selected as the path. In FIG. 1, the first communication route is indicated by a solid line depicted by a reference numeral 29.

The first stage S1 is followed by a second stage S2 at which the unit specifying circuit 17 specifies the first and the second specified unit. More particularly, the first and the fifth crossconnect systems 13a and 13e are specified as the first and the second specified units, respectively.

The second stage S2 is followed by a third stage S3 at which the control section 21 judges whether or not the failure signal is generated in the first and the second terminal sections 24 and 25. The path, for example, the first communication route 29 generates the path alarm indication signal upon occurrence of a failure and will be referred to herein as a signal generating arrangement. The path alarm indication signal reaches each of the first, the second, the fourth, and the fifth crossconnect systems 13a, 13b, 13d, and 13e through the path. Responsive to the path alarm indication signal, the first and the second terminal sections 24 and 25 generate the failure signal. In other words, each of the first and the second terminal sections 24 and 25 processes the alarm indication signal into the failure signal and will be referred to as a signal processing arrangement. A combination of the signal generating and the signal processing arrangements is referred to as a failure detecting arrangement.

In absence of the failure signal, the third stage S3 proceeds to a fourth stage S4 at which the path is brought into a communication standby state in the manner known in the art. In presence of the failure signal, the third stage S3 proceeds to a fifth stage S5 at which the above-mentioned specific logical algorithm is processed by the first and the second specified units in cooperation.

The fifth stage S5 is followed by a sixth stage S6 at which the switching section 23 in each of the first, the second, the fourth, and the fifth crossconnect systems 13a, 13b, 13d, and 13e switches interconnection between the lines 27 and 28. As a result, one of the second through the fourth communication routes is selected as the path. Therefore, the switching section 23 is referred to as an additional route selecting arrangement. The sixth stage S6 returns to the third stage S3.

While the present invention has thus far been described in connection with only a single preferred embodiment thereof, it will readily be possible for those skilled in the art to put this invention into practice in various other manners. For example, each of the first and the second terminal sections may be designed to generate the failure signal in response to not only the path alarm indication signal but also the line alarm indication signal.

What is claimed is:

1. An apparatus for administrating a transmission network including a plurality of crossconnect systems and a plurality of communication routes parallel to one another among said crossconnect systems, said apparatus comprising:

route selecting means for selecting, as a path for communication, a particular one of said communication routes on carrying out said communication to produce a route signal representative of said particular one of said communication routes;

unit specifying means connected to said route selecting means for specifying, as a first and a second specified unit, specific ones of said crossconnect systems in accordance with said route signal, said specific ones being at both ends of said path, respectively;

failure detecting means connected to said path and said first specified unit for detecting a failure in said path to produce a failure signal representative of said failure;

operation executing means connected to said second specified unit and said failure detecting means or executing a predetermined operation in cooperation with said second specified unit in accordance with said failure signal to make said second specified unit generate a completion signal representative of completion of said predetermined operation; and additional route selecting means connected to said operation executing means for selecting, as said path, another one of said communication routes in response to said completion signal.

2. An apparatus as claimed in claim 1, wherein said failure detecting means comprises:

signal generating means connected to said path for generating an alarm indication signal upon occurrence of the failure in said path; and signal processing means connected to said first specified unit and said signal generating means for processing said alarm indication signal into said failure signal.

3. An apparatus as claimed in claim 2, wherein said particular one of the communication routes comprises an additional specific unit, and wherein said signal generating means is for generating, as said alarm indication signal, a path alarm indication signal upon occurrence of the failure in said particular on of said communication routes, said path alarm indication signal being supplied to each of said first and said second specified units through said particular one of said communication routes without being terminated at said additional specific unit.

4. An apparatus as claimed in claim 1, wherein said path comprises signal generating means for generating an alarm indication signal upon occurrence of the failure in said path, said failure detecting means comprising signal processing means connected to said first specified unit and said signal generating means for processing said alarm indication signal into said failure signal.

* * * * *